United States Patent
Tsai

(10) Patent No.: US 9,748,889 B2
(45) Date of Patent: Aug. 29, 2017

(54) SHUTDOWN METHOD FOR MOTOR AND MOTOR DRIVE CIRCUIT THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 73 days.

(21) Appl. No.: 14/989,832

(22) Filed: Jan. 7, 2016

(65) Prior Publication Data

US 2017/0085210 A1  Mar. 23, 2017

(30) Foreign Application Priority Data

Sep. 23, 2015 (TW) .............................. 104131405 A

(51) Int. Cl.
   *H02P 3/22* (2006.01)
   *H02P 29/024* (2016.01)

(52) U.S. Cl.
   CPC ............ *H02P 29/0241* (2016.02); *H02P 3/22* (2013.01)

(58) Field of Classification Search
   CPC .................................. H02P 29/024; H02P 3/22
   See application file for complete search history.

(56) References Cited

U.S. PATENT DOCUMENTS

| 5,504,402 A * | 4/1996 | Menegoli | G11B 19/20 318/368 |
| 6,020,695 A * | 2/2000 | Kelly | G11B 19/20 318/34 |
| 6,531,839 B1 * | 3/2003 | Shin | H02P 6/24 318/362 |
| 2010/0079093 A1 * | 4/2010 | Kitanaka | B60L 3/003 318/400.3 |
| 2010/0237694 A1 * | 9/2010 | Fuma | B60L 11/123 307/9.1 |
| 2013/0062985 A1 * | 3/2013 | Jin | H02K 1/2786 310/156.43 |
| 2013/0204477 A1 * | 8/2013 | Sakata | B60L 3/0015 701/22 |
| 2014/0265947 A1 * | 9/2014 | Hsu | H02P 25/184 318/139 |

* cited by examiner

*Primary Examiner* — Kawing Chan
(74) *Attorney, Agent, or Firm* — Li & Cai Intellectual Property (USA) Office

(57) ABSTRACT

Disclosed are a shutdown method for motor and a motor driving circuit using the same. The method comprises: shutting down a higher gate switch and a lower gate switch when a supply voltage decreases, such that the storage capacitor is charged via a back electromotive force, wherein the back electromotive force decreases as the motor gradually stops; driving the motor when the voltage of the storage capacitor is again larger than the first threshold voltage; determining whether the voltage of the storage capacitor is lower than a shutdown threshold voltage when the voltage of the storage capacitor is lower than the first threshold voltage, wherein the shutdown threshold voltage is lower than the first threshold voltage; and turning on the lower gate switch when the voltage of the first threshold voltage is lower than the shutdown threshold voltage, wherein the back current is related to the back electromotive force.

13 Claims, 6 Drawing Sheets

SHUTDOWN METHOD FOR MOTOR AND MOTOR DRIVE CIRCUIT THEREOF

BACKGROUND OF THE INVENTION

1. Field of the Invention

The instant disclosure relates to a shutdown method for motor; in particular, to a shutdown method for motor that can prevent the motor from the damage caused by the back current and can avoid generating the over current and a motor driving circuit using the same.

2. Description of Related Art

With the development of technology, the motor has become an essential electric device. The common motors, such as the DC motor, the AC motor, the stepping motor and the like, have been widely used to drive fans.

The motor comprises the higher gate switch, the lower gate switch and the driving circuit. The driving circuit controls the tuning on and off of the higher gate switch and the lower gate switch. The higher gate switch and the lower gate switch are related to the working status of the motor. Precisely, the driving circuit controls the turning on and of the higher gate switch and the lower gate switch, to output the voltage for changing the polarity of the coil of the motor rotator. Via the mutual effect between the polarity of the coil and the polarity of the motor rotator, the motor rotator would rotate because of the polarity of the coil. The change of the magnetic flux results in the reverse voltage, which is the Back Electromotive Force (BEMF).

When the motor is shut down, the power supply stops providing the supply voltage to the motor, such that the supply voltage starts to decrease. When the supply voltage is lower than the BEMF, the back current would be generated inside the motor because of the BEMF. The back current flows back to the higher gate switch and the lower gate switch, which damages the higher gate switch, the lower gate switch and the power supply.

In practice, a protection diode would be configured between the power supply and the motor driver to prevent the back current inside the motor from flowing back to the power supply. Thus, when shutting down the motor, the back current generated by the BEMF can just flow to the storage capacitor of the motor driver, which results in the increase of the BEMF. However, if the BEMF is too large, it is possible to damage the motor drover. In order to prevent the motor driver from being damaged by the back current, in a traditional way, after the power supply stops providing the supply voltage, the higher gate switch is turned off and the lower gate switch is turned on. Thereby, the back current flows to the lower gate switch to prevent the power supply and the higher gate switch from damaging by the BEMF.

However, there is a disadvantage in this traditional way. The value of the back current is directly proportional to two factors. One is the voltage value of the BEMF, and the other one is the voltage of the motor coil, which is the voltage of the node between the higher gate switch and the lower gate switch. If the BEMF is larger, the back current would also be larger. If the voltage of the motor coil is smaller, the voltage to resist the BEMF would be smaller. Thus, when the lower gate switch is turned on, the back current would be so large as to damage the lower gate switch. In other words, the traditional way cannot protect the higher gate switch, the lower gate switch and the power supply simultaneously.

SUMMARY OF THE INVENTION

The instant disclosure provides a shutdown method for motor, comprising: (A) shutting down a higher gate switch and a lower gate switch when a supply voltage decreases to make a storage capacitor lower than a first threshold voltage, such that the storage capacitor is charged via a back electromotive force, wherein the back electromotive force decreases as the motor gradually stops; (B) driving the motor when the voltage of the storage capacitor is again larger than the first threshold voltage, such that the storage capacitor starts to discharge; (C) determining whether the voltage of the storage capacitor is lower than a shutdown threshold voltage when the voltage of the storage capacitor is lower than the first threshold voltage, wherein the shutdown threshold voltage is lower than the first threshold voltage; and (D) turning on the lower gate switch when the voltage of the first threshold voltage is lower than the shutdown threshold voltage, such that a back current flows to the lower gate switch, wherein the back current is related to the back electromotive force.

The instant disclosure further provides a motor driving circuit to drive a motor. The motor driving circuit is electrically connected to a power supply and at least one full-bridge circuit. The full-bridge circuit comprises a higher gate switch and a lower gate switch. The higher gate switch is electrically connected to the lower gate switch. The motor driving circuit comprises a voltage sensing unit and a control unit. The voltage sensing unit is configured to sense the voltage of a storage capacitor. The control unit is electrically connected to the voltage sensing unit, the higher gate switch and the lower gate switch, to control the turning on and off of the higher gate switch and the lower gate switch. The control unit turns off the higher gate switch and the lower gate switch when the voltage sensing unit senses that a supply voltage provided by the power supply is lower than a first threshold voltage, such that the storage capacitor is charged via a back electromotive force. The back electromotive force decreases as the motor gradually stops. The control unit drives the motor to work when the voltage of the storage capacitor is again larger than the first threshold voltage to discharge the storage capacitor. The control unit turns on the lower gate switch when the voltage sensing unit senses that the voltage of the storage capacitor is lower than both of the first threshold voltage and a shutdown threshold voltage, such that a back current flows to the lower gate switch. The back current is related to the back electromotive force and the shutdown threshold voltage is lower than the first threshold voltage.

To sum up, the shutdown method for motor and the motor driving circuit using the same provided by the instant disclosure can protect the elements of a motor from damage due to the leftover back electromotive force in the motor when the motor is shut down. In addition, in the shutdown method for motor provided by the instant disclosure, after the back electromotive force decreases and would not damage the motor, the lower gate switch of the full-bridge circuit is turned on to make the motor quickly stop. In other words, it will not take much time to entirely stop the motor.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
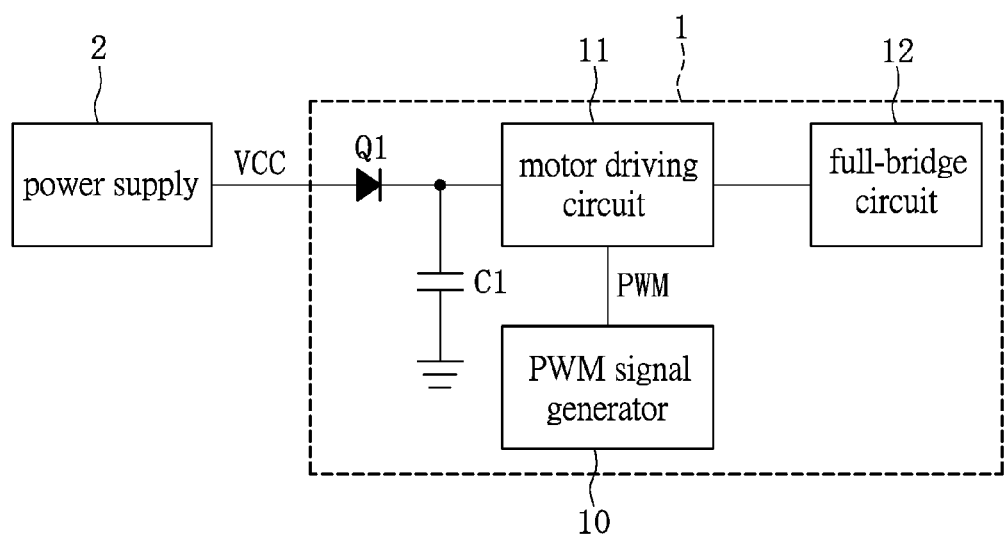
FIG. 1 shows a schematic diagram of a motor of one embodiment of the instant disclosure.

Please refer to FIG. 1. FIG. 1 shows a schematic diagram of a motor of one embodiment of the instant disclosure. The motor 1 comprises a PWM signal generator 10, a motor driving circuit 11, a full-bridge circuit 12, a protection diode Q1 and a storage capacitor C1. The PWM signal generator 10 and the full-bridge circuit 12 are electrically connected to the motor driving circuit 11 respectively. The motor driving circuit 11 is electrically connected to the power supply 2, and the protection diode Q1 is electrically connected between the motor driving circuit 11 and the power supply 2. One end of the storage capacitor C1 is electrically connected to the power supply 2 and the motor driving circuit 11, and another end of the storage capacitor C1 is grounded.

The power supply 2 comprises proper logics, circuits and/or codes, to output the supply voltage VCC to the motor 1, and to provide the energy that the motor 1 needs for working. The protection diode Q1 is configured to prevent the back current generated in the motor 1 flowing back to the power supply 2.

The storage capacitor C1 comprises proper logics, circuits and/or codes, to receive the supply voltage VCC and outputs the supply voltage VCC to the motor driving circuit 11, such that the motor driving circuit 11 can work.

The PWM signal generator 10 comprises proper logics, circuits and/or codes, to provide a PWM signal to the motor driving circuit 11. The duty cycle of the PWM signal can be changed depending on need.

The motor driving circuit 11 is configured to receive the supply voltage VCC and the PWM signal, and to control the full-bridge circuit 12 according to the duty cycle of the PWM signal.

The full-bridge circuit 12 is electrically connected to a coil (not shown), to output the voltage and to change the polarity of the coil. The polarity of the coil and the polarity of a rotator (not shown) of the motor are reversed, so that the rotator of the motor will start to rotate because of the polarity of the coil.

It should be noted that, a single phase motor is taken for example as the motor 1 in this embodiment, so the motor 1 just comprises a full-bridge circuit 12; however, it is not limited herein. In other embodiments, the motor 1 can also be a two-phase motor or a three-phase motor, and the amount of the full-bridge circuit 12 would increase with the phase number of the motor 1.

Figure 2:
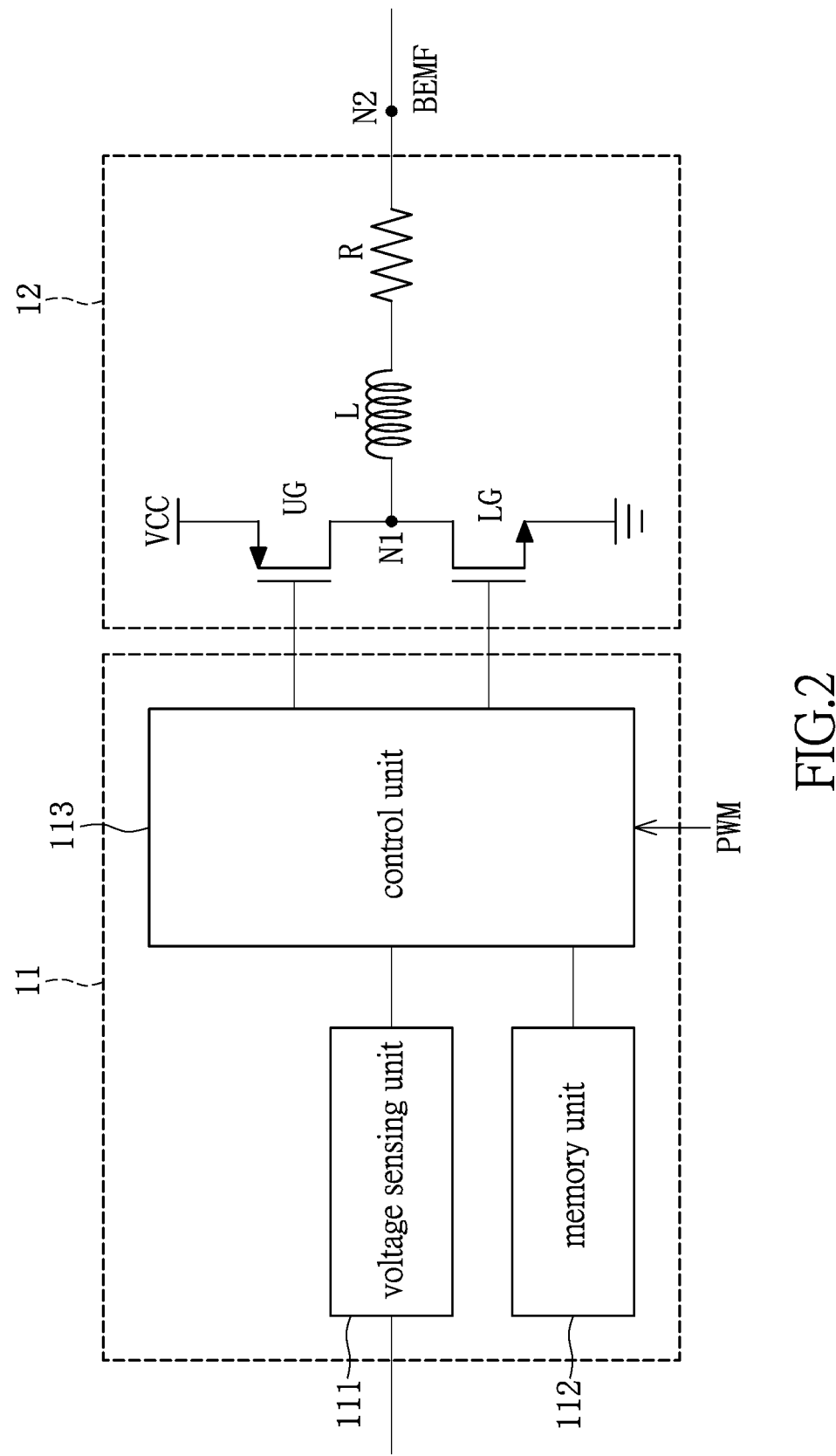
FIG. 2 shows a schematic diagram of a motor driving circuit and a full-bridge circuit of one embodiment of the instant disclosure.

In order to easily illustrate the structures of the motor driving circuit 11 and the full-bridge circuit 12, please refer to FIG. 2. FIG. 2 shows a schematic diagram of a motor driving circuit and a full-bridge circuit of one embodiment of the instant disclosure. The motor driving circuit 11 comprises a voltage sensing unit 111, a memory unit 112 and a control unit 113. The voltage sensing unit 111 and the memory unit 112 are electrically connected to the control unit 113 respectively. The voltage sensing unit 111 is further electrically connected to the above mentioned storage capacitor C1. The control unit 113 is electrically connected to the above mentioned PWM signal generator 10.

The voltage sensing unit 11 is configured to sense the current charge quantity in the storage capacitor C1, and to output a result to the control unit 113, such that the control unit 113 can control the full-bridge circuit 12 according to the voltage of the storage capacitor C1.

The memory unit 112 comprises proper logics, circuits and/or codes, to store at least one parameter needed as the motor 1 is working. For example, the parameter stored by the memory unit 112 can determine the curve representing the rotating speed, so that the motor 1 can work based on the determined curve representing the rotating speed The control unit 113 comprises proper logics, circuits and/or codes, to control the working status of the full-bridge circuit 12. Precisely, the control unit 113 selectively turns on the higher gate switch or the lower gate switch of the full-bridge circuit 12 according to the PWM signal to make the motor normally work. As the motor 1 tends to stop working, the control unit 113 turns on or off the higher gate switch or the lower gate switch according to a result sensed by the voltage sensing unit 111, so as to protect the higher gate switch, the lower gate switch, the power supply 2 and other elements of the motor 1 from damage due to the back electromotive force.

The full-bridge circuit 12 comprises a higher gate switch UG, a lower gate switch LG an inductor L and a resistor R. The higher gate switch UG is electrically connected to the lower gate switch LG The inductor L is electrically connected to the higher gate switch UG and the lower gate switch LG One end of the resistor R is electrically connected to the inductor L, and another end of the resistor R is electrically connected to a coil (not shown) of the motor 1.

In this embodiment, the higher gate switch UG is a PMOS transistor, and the lower gate switch LG is a NMOS transistor; however, the instant disclosure is not limited herein. In other embodiments, the higher gate switch UG can be a NMOS transistor.

The drain of the higher gate switch UG receives the supply voltage VCC and the source of the higher gate switch UG is electrically connected to the first node N1. The drain of the lower gate switch LG is electrically connected to the first node N1, and the source of the lower gate switch LG is grounded. In addition, the gates of the higher gate switch UG and the lower gate switch LG are electrically connected to the control unit 113 respectively. The inductor L is electrically connected to the first node N1 and the resistor R.

After the motor 1 starts to work, the coil of the motor 1 generates the induced electromotive force via the electromagnetic induction, and generates the back electromotive force BEMF simultaneously. When the motor 1 is normally working, the voltage of the back electromotive force BEMF is lower than the supply voltage VCC, so there would be not be back current generated in the full-bridge circuit 12. In addition, the voltage of the back electromotive force BEMF is directly proportional to the rotating speed (Rotation Per Minute; RPM) of the motor 1.

When the motor 1 is shut down, the voltage of the storage capacitor would decrease as the supply voltage VCC decreases. At this moment, the voltage of the back electromotive force BEMF may be larger than the voltage of the storage capacitor C1 and thus back current is generated. The value of the back current is related to the back electromotive force BEMF, the inductor L and the resistor R. The calculation for the value of the back current based on the back electromotive force BEMF, the inductor L and the resistor R should be understood by those skilled in the art, and thus the redundant information is not repeated. The back current flows from the second node N2 to the first node N1. If the value of the back current is too large, and the higher gate switch UG, the lower gate switch LG, the power supply 2 and other elements would be damaged. Thus, the control unit 13 would properly turn on or off the higher gate switch UG or the lower gate switch LG, and make the leftover back electromotive force BEMF run out.

Figure 3:
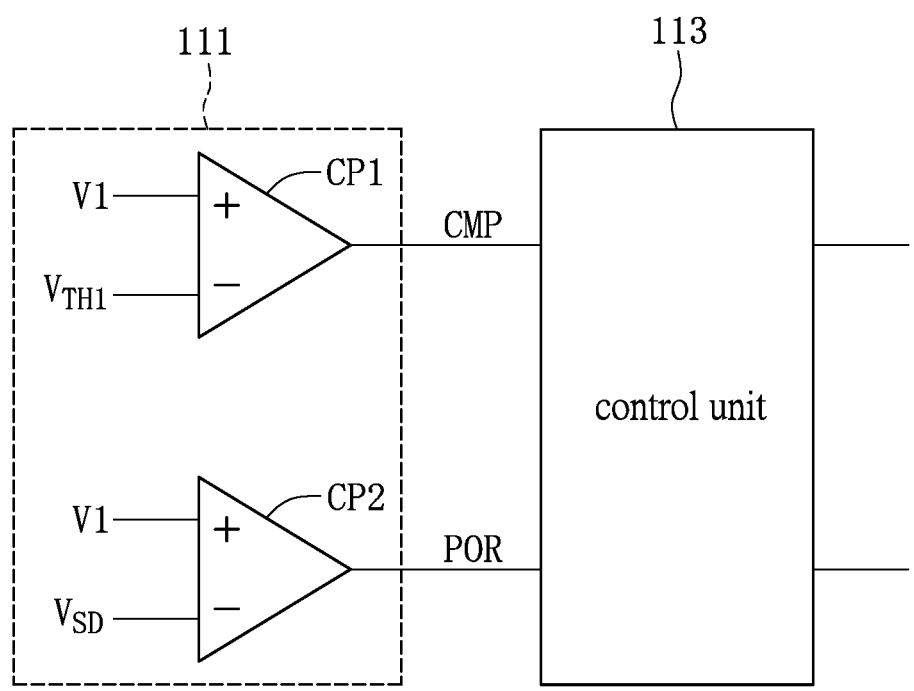
FIG. 3 shows a schematic diagram of a voltage sensing unit of one embodiment of the instant disclosure.

Please refer to FIG. 3. FIG. 3 shows a schematic diagram of a voltage sensing unit of one embodiment of the instant disclosure. The voltage sensing unit 111 comprises a first comparator CP1 and a second comparator CP2. The inverting input end of the first comparator CP1 receives the first threshold voltage VTH1, and the non-inverting input end of the first comparator CP1 receives the voltage V1 stored by the storage capacitor C1. The output end of the first comparator CP1 is electrically connected to the control unit 113. The first comparator CP1 generates the first comparison signal CMP according to the first threshold voltage VTH1 and the voltage V1 stored by the storage capacitor C1.

The inverting input end of the second comparator CP2 receives the shutdown threshold voltage VSD, and the non-inverting input end of the second comparator CP2 receives the voltage V1 stored by the storage capacitor C1. The output end of the second comparator CP2 is electrically connected to the control unit 113. The second comparator CP2 generates the second comparison signal POR according to the shutdown threshold voltage VSD and the voltage V1 stored by the storage capacitor C1. It should be noted that, the value of the shutdown threshold voltage VSD is lower than the value of the first threshold voltage VTH1.

In addition, the magnitude of the first threshold voltage VTH1 and the shutdown threshold voltage VSD is not restricted here in this embodiment. Those skilled in the art can adjust the magnitude of the first threshold voltage VTH1 and the shutdown threshold voltage VSD depending on need, as long as the value of the shutdown threshold voltage VSD is lower than the value of the first threshold voltage VTH1.

Figure 4:
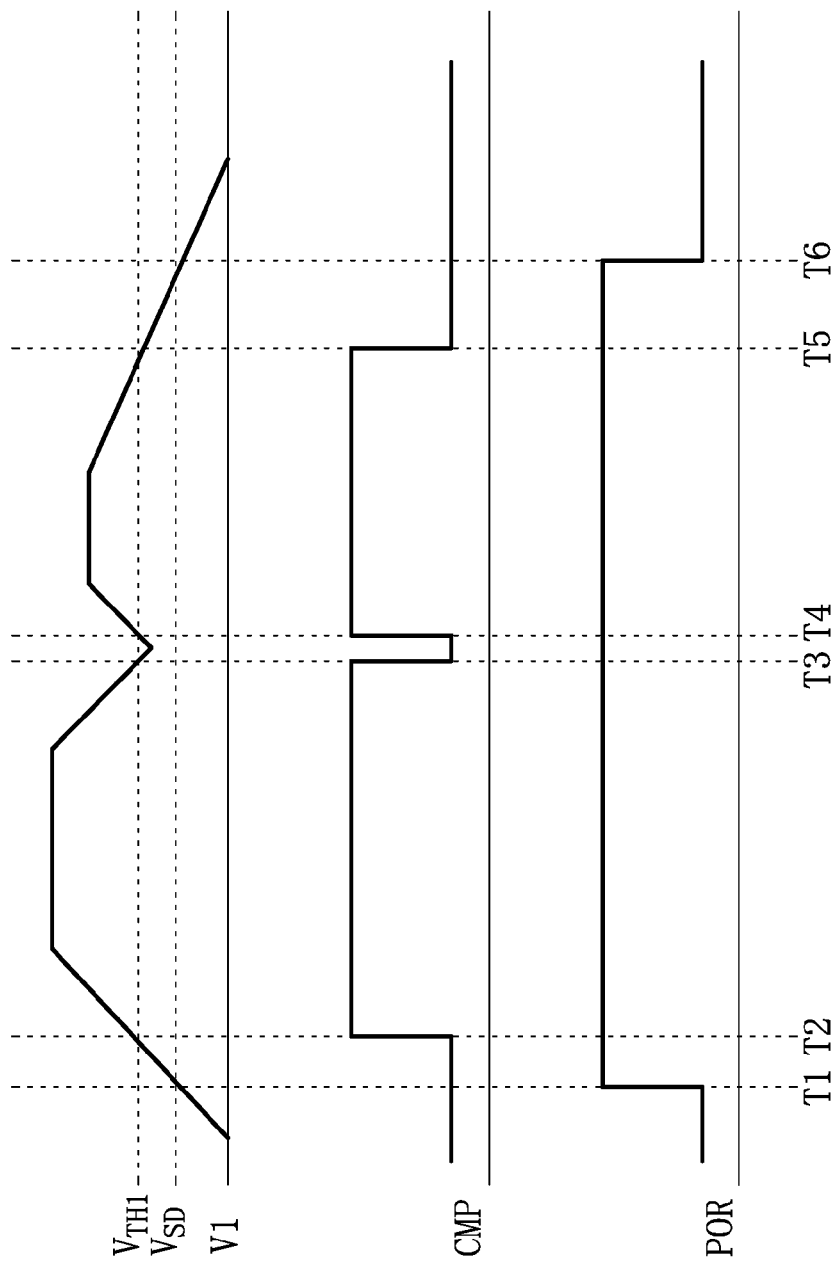
FIG. 4 shows waveform diagrams of the voltage stored in the storage capacitor and the comparison signal of one embodiment of the instant disclosure.

To illustrate the flow of shutting-down the motor driving circuit 11, please refer to FIG. 4. FIG. 4 shows waveform diagrams of the voltage stored in the storage capacitor and the comparison signal of one embodiment of the instant disclosure. As the power supply 2 starts to provide the supply voltage VCC to the motor 1, the storage capacitor C1 starts to charge. In other words, the voltage V1 of the storage capacitor C1 starts to increase. At the timing T1, the second comparator CP2 outputs the second comparison signal POR at high level, when the voltage V1 of the storage capacitor C1 is larger than the shutdown threshold voltage VSD, such as 2.6V At the timing T2, the first comparator CP1 outputs the first comparison signal CMP at high level, when the voltage V1 of the storage capacitor C1 continually increases and becomes larger than the first threshold voltage VTH1, such as 3.2V.

After the voltage V1 of the storage capacitor C1 reaches to the first threshold voltage VTH1, the control unit 113 starts to drive the rotator of the motor according to the PWM signal and the parameter stored in the memory unit 112 so as to make the motor 1 work normally.

At the moment when the motor 1 is about to be shut down, the power supply 2 stops providing the supply voltage VCC. After that, the voltage V1 of the storage capacitor C1 starts to decrease. However, the back electromotive force BMEF would not decrease quick because the rotator of the motor cannot stop immediately due to the inertia. At the timing T3, the voltage V1 of the storage capacitor C1 is lower than the first threshold voltage VTH1, and the first comparator CP1 outputs the first comparison signal CMP at low level.

In order not to directly turn on the lower gate switch LG and make the larger back current be generated because of the back electromotive force BEMF, the control unit 113 turns off the higher gate switch UG and the lower gate switch LG simultaneously. The back current generated due to the back electromotive force BEMF flows to the storage capacitor C1 via the body diode of the higher gate switch UG, such that the storage capacitor C1 starts to charge. In other words, at this moment, the motor 1 starts to store power according to the leftover back electromotive force BEMF. At the timing T4, the voltage V1 of the storage capacitor C1 is again larger than the first threshold voltage VTH1, and the first comparator CP1 outputs the first comparison signal CMP at high level.

At this moment, the voltage V1 of the storage capacitor is not lower than the shutdown threshold voltage VSD, so the parameters needed for the rotation of the motor 1 are kept, and according to them and the PWM signal the control unit 113 controls the turning on and off of the higher gate switch UG and the lower gate switch LG, such that the rotator of the motor 1 can provide a correct output to make the motor 1 continually work for a while.

The voltage V1 of the storage capacitor C1 again decreases with the rotation of the motor 1. At the timing T5, the voltage V1 of the storage capacitor C1 is again lower than the first threshold voltage VTH1, and the first comparator CP1 outputs the first comparison signal CMP at low level. After receiving the first comparison signal CMP at low level, the control unit 113 turns off the higher gate switch UG and the lower gate switch LG, such that the storage capacitor C1 again starts to store power due to the back electromotive force BEMF. In other words, the storage capacitor C1 would repeatedly charge and discharge.

The rotating speed of the motor 1 continues to decrease, so the back electromotive force BEMF also decreases, which represents that the back current generated due to the back electromotive force BEMF becomes smaller. Thus, after turning off the higher gate switch UG and the lower gate switch LG, the back electromotive force BEMF left in the motor 1 is not enough to raise the voltage V1 to drive the motor to work, and the voltage V1 of the storage capacitor C1 would continue to decrease. At the timing T6, the voltage V1 of the storage capacitor C1 is lower than the shutdown threshold voltage VSD, and the second comparator CP2 outputs the second comparison signal POR at low level. After receiving the second comparison signal POR, the control unit 113 turns on the lower gate switch LG to finish the shutting-down of the motor. The lower gate switch LG is turned on, so the back current generated due to the back electromotive force BEMF flows to the lower gate switch LG The value of the back current becomes smaller, so the lower gate switch LG would not be damaged by the back current. In other words, the motor driving circuit 11 provided by this embodiment can prevent the higher gate switch UG the lower gate switch LG, the power supply 2 and other elements from damaging by the back electromotive force BEMF.

Moreover, the turning on of the lower gate switch LG fixes the polarity of the coil. That is, the rotator of the motor is locked. Thereby, the motor 1 can stop working immediately and would not continually work for a while due to the inertia.

On other hand, after receiving the first comparison signal CMP at low level and the second comparison signal POR at low level, the control unit 113 outputs a reset signal to the memory unit 112 to delete the stored parameters. The memory unit 112 again stores the parameters needed for the rotation of the motor until the motor again starts up.

Figure 5:
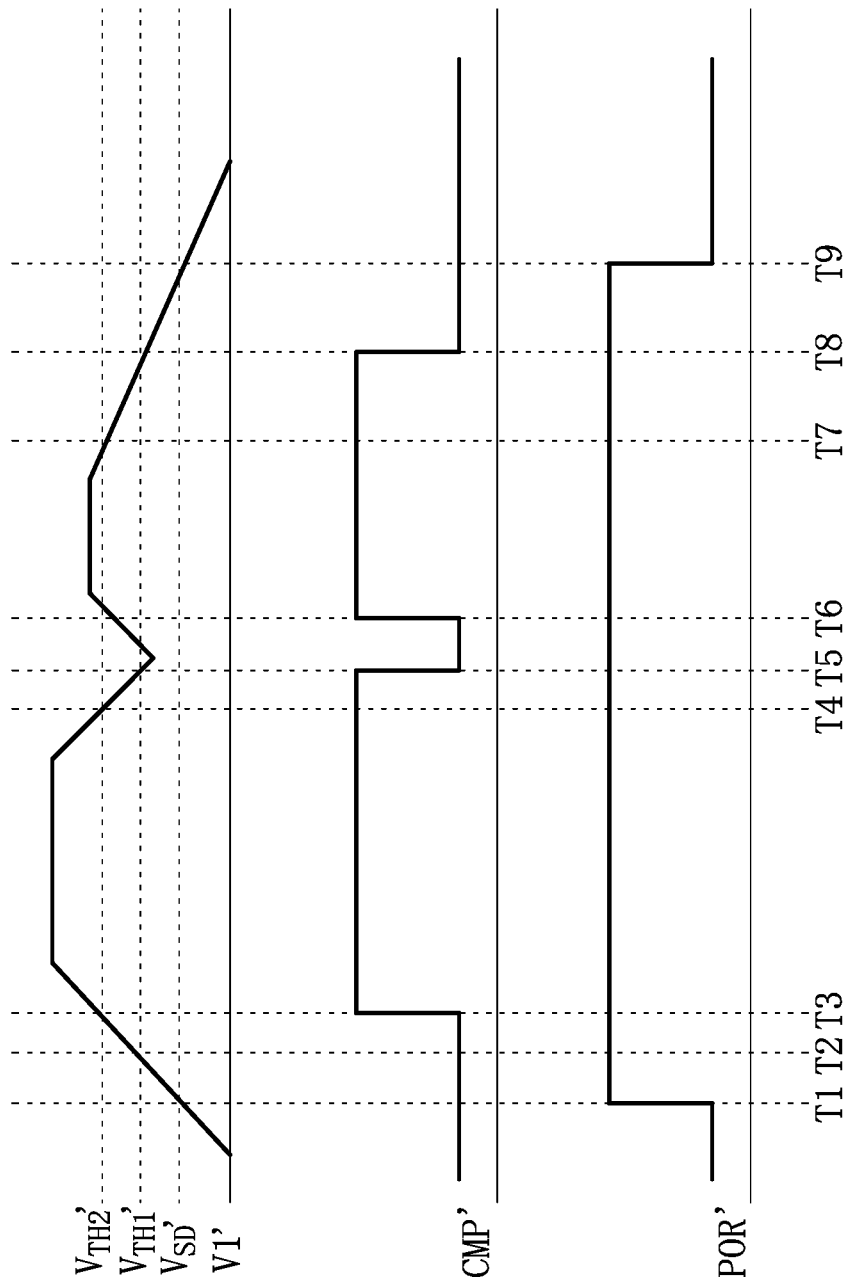
FIG. 5 shows waveform diagrams of the voltage stored in the storage capacitor and the comparison signal of another embodiment of the instant disclosure.

It is worth mentioning that, in this embodiment, the first threshold voltage VTH1 is constant. In other embodiments, the first threshold voltage VTH1 can be within an interval. To illustrate precisely, please refer to FIG. 5. FIG. 5 shows waveform diagrams of the voltage stored in the storage capacitor and the comparison signal of another embodiment of the instant disclosure. In this embodiment, the first comparator CP1' receives the first threshold voltage VTH1' and sets the first threshold voltage VTH1' to be within a first threshold interval via the magnetic hysteresis. The lower bound of the first threshold interval is the first threshold voltage VTH1', the upper bound is the second threshold voltage VTH2'. In addition, the difference between the circuit structures corresponding to the embodiment in FIGS. 4-5 is that, the first comparator CP1 in FIG. 4 compares the voltage V1 of the storage capacitor C1 with a constant value, but the first comparator CP1' in FIG. 5 compares the voltage V1' of the storage capacitor C1' with values within an interval.

As mentioned above, when the motor 1' starts up, the voltage V1 of the storage capacitor C1' starts to increase. At timing T1, the second comparator CP2' outputs the second comparison signal POR' at high level, when the voltage V1' of the storage capacitor C1' is larger than the shutdown threshold voltage VSD', such as 2.6V.

At the timing T2, the voltage V1' of the storage capacitor C1' continues to increase and becomes larger than the first threshold voltage VTH1', such as 3.2V. At this moment, the first comparator CP1 still outputs the first comparison signal CMP' at low level. At the timing T3, the first comparator CP1' outputs the first comparison signal CMP' at high level, until the voltage V1' of the storage capacitor C1' is larger than the second threshold voltage VTH2', such as 4.2V After the voltage V1' of the storage capacitor C1' reaches to the second threshold voltage VTH2', the control unit 113 starts to drive the rotator of the motor according to the PWM signal PWM' and the parameters stored in the memory unit 112.

At the moment when the motor 1' is about to be shut down, the motor driving circuit starts the flow of shutting-down. The power supply 2' stops providing the supply voltage VCC such that the voltage V1' of the storage capacitor C1' starts to decrease. At the timing T4, the voltage V1' of the storage capacitor C1' is lower than the second threshold voltage VTH2', but the first comparator CP1' still outputs the first comparison signal CMP' at high level. At the timing T5, the voltage V1' of the storage capacitor C1' is lower than the first threshold voltage VTH1', and the first comparator CP1' outputs the first comparison signal CMP' at low level. After that, the control unit 113' turns off the higher gate switch UG' and the lower gate switch LG' such that the storage capacitor C1' starts to charge. At the timing T6, the voltage V1' of the storage capacitor C1' is again larger than the second threshold voltage VTH2', and the first comparator CP1' outputs the first comparison signal CMP' at high level. At this moment, the control unit 113' controls the turning on and off of the higher gate switch UG' and the lower gate switch LG, such that the rotator of the motor 1 can provide a correct output to make the motor 1 continually work for a while.

The voltage V1' of the storage capacitor C1' again decreases with the rotation of the motor 1'. At the timing T7, the voltage V1' of the storage capacitor C1' is again lower than the second threshold voltage VTH2', but the first comparator CP1' still outputs the first comparison signal CMP' at high level. At the timing T8, the voltage V1' of the storage capacitor C1' is again lower than the first threshold voltage VTH1', and the first comparator CP1' outputs the first comparison signal CMP' at low level. After receiving the first comparison signal CMP' at low level, the control unit 113' turns off the higher gate switch UG' and the lower gate switch LG', such that the storage capacitor C1' again starts to store power due to the back electromotive force BEMF'.

The back electromotive force BEMF' decreases with the decrease of the rotating speed of the motor 1', so the back electromotive force BEMF' becomes smaller and smaller. Thus, after turning off the higher gate switch UG' and the lower gate switch LG', the back electromotive force BEMF' left in the motor 1' is not enough to raise the voltage V1' to drive the motor 1' to work, and the voltage V1' of the storage capacitor C1' continues to decrease. At the timing T9, the voltage V1' of the storage capacitor C1' is lower than the shutdown threshold voltage VSD', and the second comparator CP2' outputs the second comparison signal POR' at low level. After receiving the second comparison signal POR' at low level, the control unit 113' turns on the lower gate switch LG' to finish the shutting-down of the motor.

The first comparator CP1' outputs the first comparison signal CMP1' according to the above mentioned first threshold interval, so that the control unit 113' can avoid making errors when estimating the currently stored voltage in the storage capacitor C1'. Precisely, the voltage V1' of the storage capacitor C1' may not be shown as a linear straight line, but a zigzag curve. In other words, the voltage V1' of the storage capacitor C1' would continually and repeatedly increase and decrease. Thus, the first comparator CP1' estimates the voltage change of the storage capacitor C1' via the first threshold interval, so as to effectively avoid making errors when estimating the voltage V1' of the storage capacitor C1' and thus preventing the higher gate switch UG' and the lower gate switch LG' from wrongly turning on or off.

Figure 6:
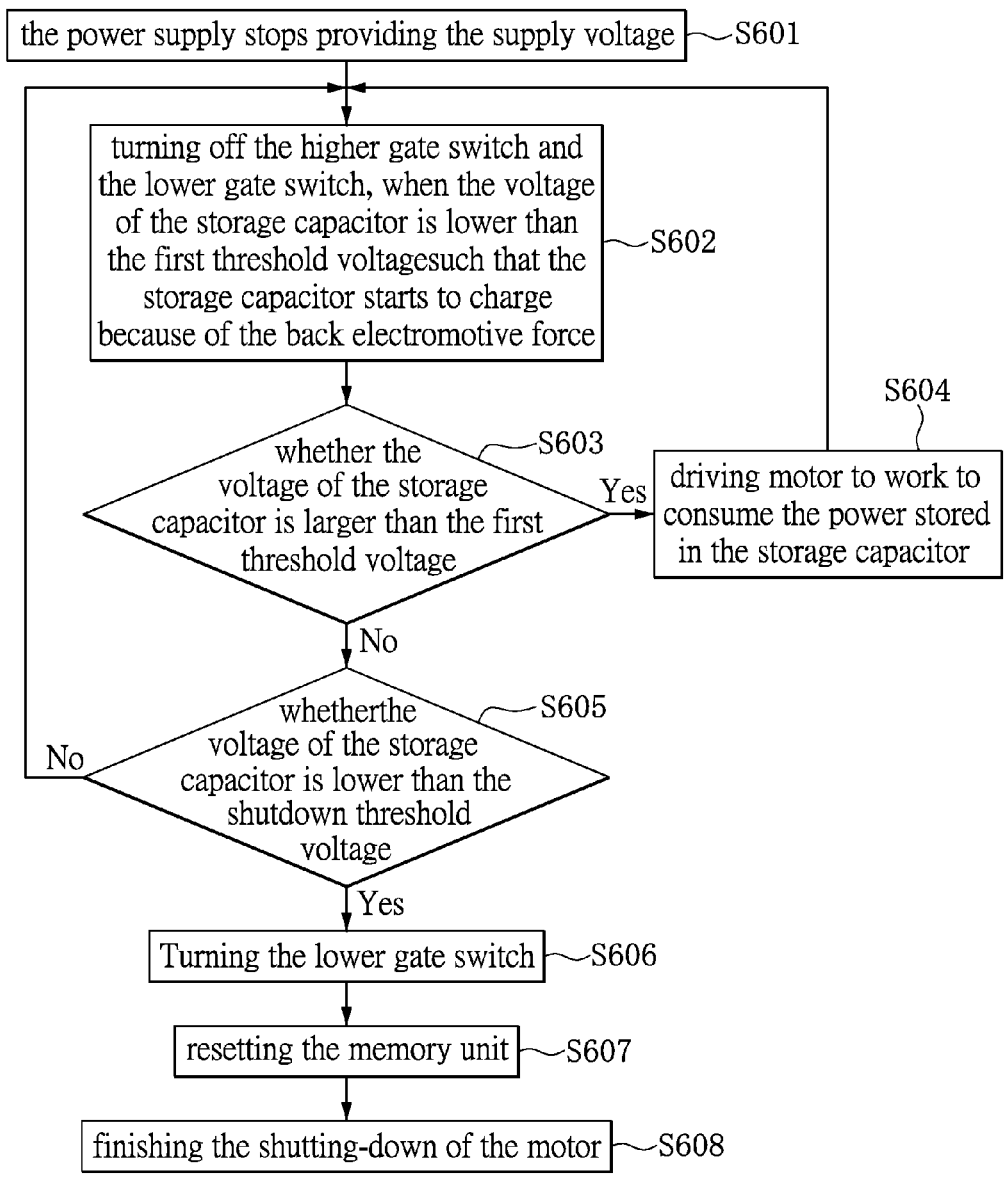
FIG. 6 shows a flow chart of a shutdown method for motor of one embodiment of the instant disclosure.

Please refer to FIG. 6. FIG. 6 shows a flow chart of a shutdown method for motor of one embodiment of the instant disclosure. The shutdown method for motor is used in the above mentioned motor driving circuit 11. In addition, the shutdown method for motor in this embodiment can be used in the single-phase motor, the two-phase motor or the three-phase motor. In the step S601, the power supply stops providing the supply voltage to the motor, such that the motor starts the flow of shutting-down. In the step S602, the control unit turns off the higher gate switch and the lower gate switch of the full-bridge circuit, when the voltage sensing unit of the motor senses that the voltage of the storage capacitor is lower than the first threshold voltage.

Thereby, the current generated by the back electromotive force flows to the storage capacitor, such that the storage capacitor starts to charge.

In the step S603, the control unit determines whether the voltage of the storage capacitor is larger than the first threshold voltage according to a result sensed by the voltage sensing unit. If the voltage of the storage capacitor is larger than the first threshold voltage, it goes to the step S604. If the voltage of the storage capacitor is lower than the first threshold voltage, it goes to the step S605.

In the step S604, the voltage of the storage capacitor is larger than the first threshold voltage, so the control unit drives the motor to work according to the PWM signal to consume the power stored in the storage capacitor. In other words, the motor would still work for a while because of the leftover back electromotive force. After that, it returns to the step S602, the voltage sensing unit continues to sense the voltage of the storage capacitor, such that the control unit can control the higher gate switch and the lower gate switch according to the result sensed by the voltage sensing unit.

In the step S605, the back electromotive force decreases with the decrease of the rotating speed of the motor, so the back current generated by the back electromotive force becomes smaller and smaller. Finally, the back electromotive force cannot provide enough voltage to the storage capacitor, which makes the voltage of the storage capacitor continue to decrease. The voltage sensing unit senses whether the voltage of the storage capacitor is lower than the shutdown threshold voltage. If the voltage of the storage capacitor is lower than the shutdown threshold voltage, it goes to the step S606. If the voltage of the storage capacitor is larger than the shutdown threshold voltage, it returns to the step S602, and the control unit makes the higher gate switch and the lower gate switch stay off.

In the step S606, the control unit turns on the lower gate switch and makes the higher gate switch stay off. Thereby, the back current generated due to the back electromotive force flows to the lower gate switch such that the motor immediately stops working. In the step S607, the control unit resets the parameters stored in the memory unit of the motor. In the step S608, the shutting-down of the motor is finished and the shutdown method for motor ends.

To sum up, the shutdown method for motor and the motor driving circuit using the same provided by the instant disclosure can protect the elements of a motor from damage due to the leftover back electromotive force in the motor when the motor is shut down. In addition, in the shutdown method for motor provided by the instant disclosure, after the back electromotive force decreases to where it would not damage the motor, the lower gate switch of the full-bridge circuit is turned on to make the motor quickly stop. In other words, it will not take much time to entirely stop the motor.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A shutdown method for motor, comprising:
   (A) shutting down a higher gate switch and a lower gate switch when a supply voltage decreases to make a storage capacitor lower than a first threshold voltage, such that the storage capacitor is charged via a back electromotive force, wherein the back electromotive force decreases as the motor gradually stops;
   (B) driving the motor when the voltage of the storage capacitor is again larger than the first threshold voltage, such that the storage capacitor starts to discharge;
   (C) determining whether the voltage of the storage capacitor is lower than a shutdown threshold voltage when the voltage of the storage capacitor is lower than the first threshold voltage, wherein the shutdown threshold voltage is lower than the first threshold voltage; and
   (D) turning on the lower gate switch when the voltage of the first threshold voltage is lower than the shutdown threshold voltage, such that a back current flows to the lower gate switch, wherein the back current is related to the back electromotive force.

2. The shutdown method for motor according to claim 1, further comprising:
   (E) resetting a memory unit of the motor when the voltage of the storage capacitor is lower than both of the storage capacitor and the shutdown threshold voltage, wherein the memory unit stores at least one parameter, and the parameter is related to the working status of the motor.

3. The shutdown method for motor according to claim 1, wherein the back electromotive force is directly proportional to the rotating speed of the motor, and the leftover back electromotive force runs out from the motor to prevent the motor from being damaged by the back electromotive force.

4. The shutdown method for motor according to claim 1, wherein in the step (D), a rotator of the motor stops rotating once the lower gate switch is turned on to reduce the time consumption for turning off the motor.

5. The shutdown method for motor according to claim 1, wherein the higher gate switch is a NMOS transistor or a PMOS transistor.

6. The shutdown method for motor according to claim 1, wherein the first threshold voltage is set within a first threshold interval via the magnetic hysteresis, the motor normally works when the voltage of the storage capacitor is larger than the voltage within the first threshold interval, turning off the higher gate switch and the lower gate switch when the voltage of the storage capacitor is lower than the voltage within the first threshold interval but larger than the shutdown threshold voltage, and turning off the higher gate switch and turning on the lower gate switch when the voltage of the storage capacitor is lower than both of the voltage within the first threshold interval and the shutdown threshold voltage.

7. A motor driving circuit, to drive a motor, the motor driving circuit electrically connected to a power supply and at least one full-bridge circuit, wherein the full-bridge circuit comprises a higher gate switch and a lower gate switch, the higher gate switch is electrically connected to the lower gate switch, the motor driving circuit comprising:
   a voltage sensing unit, sensing the voltage of a storage capacitor; and
   a control unit, electrically connected to the voltage sensing unit, the higher gate switch and the lower gate switch, to control the turning on and off of the higher gate switch and the lower gate switch;
   wherein the control unit turns off the higher gate switch and the lower gate switch when the voltage sensing unit senses that a supply voltage provided by the power supply lower than a first threshold voltage, such that the storage capacitor is charged via a back electromotive force, wherein the back electromotive force decreases as the motor gradually stops and wherein the control unit drives the motor to work when the voltage of the storage capacitor is again larger than the first threshold voltage to discharge the storage capacitor;

wherein the control unit turns on the lower gate switch when the voltage sensing unit senses that the voltage of the storage capacitor is lower than both of the first threshold voltage and a shutdown threshold voltage, such that a back current flows to the lower gate switch, wherein the back current is related to the back electromotive force and the shutdown threshold voltage is lower than the first threshold voltage.

8. The motor driving circuit according to claim 7, further comprising:
   a memory unit, electrically connected to the control unit, to store at least one parameter, wherein the parameter related to the working status of the motor;
   wherein the control unit resets the memory unit when the voltage of the storage capacitor is lower than both of the first threshold voltage and the shutdown threshold voltage.

9. The motor driving circuit according to claim 7, wherein the back electromotive force is directly proportional to the rotating speed of the motor, and the leftover back electromotive force runs out from the motor to prevent the motor from being damaged by the back electromotive force.

10. The motor driving circuit according to claim 7, wherein a rotator of the motor stops rotating once the lower gate switch is turned on to reduce the time consumption for turning off the motor.

11. The motor driving circuit according to claim 7, wherein the higher gate switch is a NMOS transistor or a PMOS transistor.

12. The motor driving circuit according to claim 7, wherein the voltage sensing unit comprises:
   a first comparator, electrically connected to the storage capacitor and the control unit, to compare the voltage of the storage capacitor and the first threshold voltage for generating a first comparison signal, and to output the first comparison signal to the control unit; and
   a second comparator, electrically connected to the storage capacitor and the control unit, to compare the voltage of the storage capacitor and the shutdown threshold voltage for generating a second comparison signal, and to output the second comparison signal to the control unit;
   wherein the control unit controls the turning on and off of the higher gate switch and the lower gate switch according to the first comparison signal and the first comparison signal.

13. The motor driving circuit according to claim 12, wherein the first comparator sets the first threshold voltage within a first threshold interval via the magnetic hysteresis, the first comparator outputs the first comparison signal at high level and the motor driving circuit drives the motor to normally work when the voltage of the storage capacitor is larger than the voltage within the first threshold interval, the first comparator outputs the first comparison signal at low level and the control unit turns off the higher gate switch and the lower gate switch when the voltage of the storage capacitor is lower than the voltage within the first threshold interval but larger than the shutdown threshold voltage, and the second comparator outputs the second comparison signal at low level and the control unit turns off the higher gate switch but turns on the lower gate switch when the voltage of the storage capacitor is lower than both of the voltage within the first threshold interval and the shutdown threshold voltage.

\* \* \* \* \*